(12) United States Patent
Walker et al.

(10) Patent No.: US 10,745,076 B2
(45) Date of Patent: Aug. 18, 2020

(54) VIBRATION DAMPING INSERT

(71) Applicant: Zephyros, Inc., Romeo, MI (US)

(72) Inventors: Jason Walker, Lenox, MI (US); Manish Taxak, Pune (IN); Sajesh Madhavan, Pune (IN)

(73) Assignee: Zephyros, Inc., Romeo, MI (US)

( * ) Notice: Subject to any disclaimer, the term of this patent is extended or adjusted under 35 U.S.C. 154(b) by 194 days.

(21) Appl. No.: 15/561,119

(22) PCT Filed: Apr. 1, 2016

(86) PCT No.: PCT/US2016/025676
§ 371 (c)(1),
(2) Date: Sep. 25, 2017

(87) PCT Pub. No.: WO2016/161350
PCT Pub. Date: Oct. 6, 2016

(65) Prior Publication Data
US 2018/0127050 A1 May 10, 2018

Related U.S. Application Data

(60) Provisional application No. 62/141,440, filed on Apr. 1, 2015.

(51) Int. Cl.
*A63B 60/54* (2015.01)
*B62K 21/14* (2006.01)
(Continued)

(52) U.S. Cl.
CPC ............. *B62K 21/14* (2013.01); *B62J 25/00* (2013.01); *B62K 11/14* (2013.01); *F16F 7/087* (2013.01);
(Continued)

(58) Field of Classification Search
CPC .......... B62K 21/14; B62K 11/14; B62J 25/00; F16F 7/087; F16F 9/3207; F16F 9/003;
(Continued)

(56) References Cited

U.S. PATENT DOCUMENTS 2,231,847 A * 2/1941 Dickson ................. A63B 53/02
473/306
5,052,665 A * 10/1991 Sakuragi .............. B60G 15/068
188/322.12

(Continued)

FOREIGN PATENT DOCUMENTS

CN 2130754 Y 4/1993
CN 101088847 A 12/2007
(Continued)

OTHER PUBLICATIONS

PCT Search Report & Written Opinion dated Jun. 15, 2016; Appln. No. PCT/US2016/025676 GB2074695.
(Continued)

*Primary Examiner* — Thomas W Irvin
(74) *Attorney, Agent, or Firm* — The Dobrusin Law Firm, PC

(57) ABSTRACT

An insert (510) comprising a core (532) and one or more extensions (530) extending from the core. The insert is adapted to be inserted into a cavity of a hollow tube-shaped member (512). The hollow member can be a motorcycle handlebar or footrest. The insert can be made of metal or a polymer and can be an extrusion product.

19 Claims, 3 Drawing Sheets

(51) Int. Cl.
  *B62J 25/00* (2020.01)
  *F16F 9/00* (2006.01)
  *F16F 9/32* (2006.01)
  *B62K 11/14* (2006.01)
  *F16F 7/08* (2006.01)
  *F16F 15/04* (2006.01)

(52) U.S. Cl.
  CPC ............ *F16F 9/003* (2013.01); *F16F 9/3207* (2013.01); *F16F 9/3271* (2013.01); *F16F 15/04* (2013.01); *A63B 60/54* (2015.10); *A63B 2209/00* (2013.01)

(58) Field of Classification Search
  CPC ......... F16F 9/3271; F16F 15/04; A63B 60/54; A63B 2209/00; A63B 2102/18; A63B 59/50
  See application file for complete search history.

(56) References Cited

U.S. PATENT DOCUMENTS

| | | | | | |
|---|---|---|---|---|---|
| 5,478,075 | A | * | 12/1995 | Saia | A63B 53/00 473/238 |
| 5,575,722 | A | * | 11/1996 | Saia | A63B 60/00 473/300 |
| 5,944,617 | A | * | 8/1999 | Falone | A63B 53/14 473/300 |
| 5,954,602 | A | * | 9/1999 | Eggiman | A63B 49/08 473/566 |
| 6,042,493 | A | * | 3/2000 | Chauvin | A63B 59/51 473/566 |
| 6,056,655 | A | * | 5/2000 | Feeney | A63B 59/51 473/567 |
| 6,158,726 | A | * | 12/2000 | Coleman | F16F 1/44 267/140 |
| 6,231,456 | B1 | * | 5/2001 | Rennie | A63B 53/00 473/316 |
| 6,334,824 | B1 | * | 1/2002 | Filice | A63B 59/51 473/566 |
| 6,511,392 | B1 | * | 1/2003 | Chohan | A63B 59/50 473/564 |
| 6,578,836 | B2 | * | 6/2003 | Kogure | B60G 11/16 267/136 |
| 6,793,050 | B2 | * | 9/2004 | Nylander | F16F 15/1442 188/379 |
| 7,150,113 | B2 | * | 12/2006 | Vito | B25G 1/01 36/44 |
| 7,442,134 | B2 | * | 10/2008 | Giannetti | A63B 59/51 473/567 |
| 8,177,658 | B1 | * | 5/2012 | Johnson | A63B 53/14 473/297 |
| 8,297,601 | B2 | * | 10/2012 | Vito | A43B 7/32 267/140.11 |
| 8,342,489 | B1 | * | 1/2013 | Richardson | F16F 7/116 267/140.11 |
| 8,641,551 | B2 | * | 2/2014 | Johnson | A63B 53/14 473/297 |
| 9,050,511 | B2 | * | 6/2015 | Hicks | A63B 53/00 |
| 9,242,156 | B2 | * | 1/2016 | Goodwin | G06Q 30/0621 |
| 9,511,267 | B2 | * | 12/2016 | Thurman | G06Q 30/0621 |
| 9,580,133 | B2 | * | 2/2017 | Aymar | B62K 21/26 |
| 9,731,179 | B2 | * | 8/2017 | Thurman | G06Q 30/0621 |
| 9,731,180 | B2 | * | 8/2017 | Goodwin | G06Q 30/0621 |
| 9,802,094 | B2 | * | 10/2017 | Goodwin | G06Q 30/0621 |
| 9,925,435 | B2 | * | 3/2018 | Hicks | A63B 53/00 |
| 10,189,530 | B2 | * | 1/2019 | Galstad | B62K 21/12 |
| 2003/0075406 | A1 | * | 4/2003 | Nylander | F16F 15/1435 188/379 |
| 2008/0047389 | A1 | | 2/2008 | Leclaire | |
| 2008/0274823 | A1 | * | 11/2008 | Lindner | A63B 53/00 473/297 |
| 2009/0280932 | A1 | * | 11/2009 | Tinti | A63B 60/10 473/520 |
| 2011/0111892 | A1 | * | 5/2011 | Thouin | A63B 60/10 473/520 |
| 2011/0111894 | A1 | * | 5/2011 | Thouin | A63B 60/10 473/564 |
| 2012/0146271 | A1 | * | 6/2012 | Kato | F16F 1/3849 267/293 |
| 2012/0146272 | A1 | * | 6/2012 | Oniwa | F16F 1/3849 267/293 |
| 2013/0043091 | A1 | * | 2/2013 | Wheeler | C09J 109/00 181/294 |
| 2013/0196795 | A1 | * | 8/2013 | Shocklee | A63B 15/00 473/457 |
| 2014/0135154 | A1 | * | 5/2014 | Pegnatori | A63B 60/54 473/520 |
| 2014/0274493 | A1 | * | 9/2014 | Heussner | A63B 60/42 473/519 |
| 2017/0165549 | A1 | * | 6/2017 | Stenzler | G06Q 30/0621 |

FOREIGN PATENT DOCUMENTS

| | | |
|---|---|---|
| CN | 103438115 A | 12/2013 |
| EP | 0393993 A2 | 10/1990 |
| EP | 0747098 A1 | 12/1996 |
| FR | 586679 A | 4/1925 |
| GB | 2074695 A | 11/1981 |
| JP | 08254245 A | 10/1996 |
| WO | 98/00652 A2 | 1/1998 |
| WO | 03/025056 A1 | 3/2003 |

OTHER PUBLICATIONS

European Communication dated May 8, 2020, Application No. 16719588.2.
Chinese Third Office Action dated May 18, 2020, Application No. 201680020413.3.
Chinese Search Report dated Apr. 29, 2020, Application No. 201680020413.3.

* cited by examiner

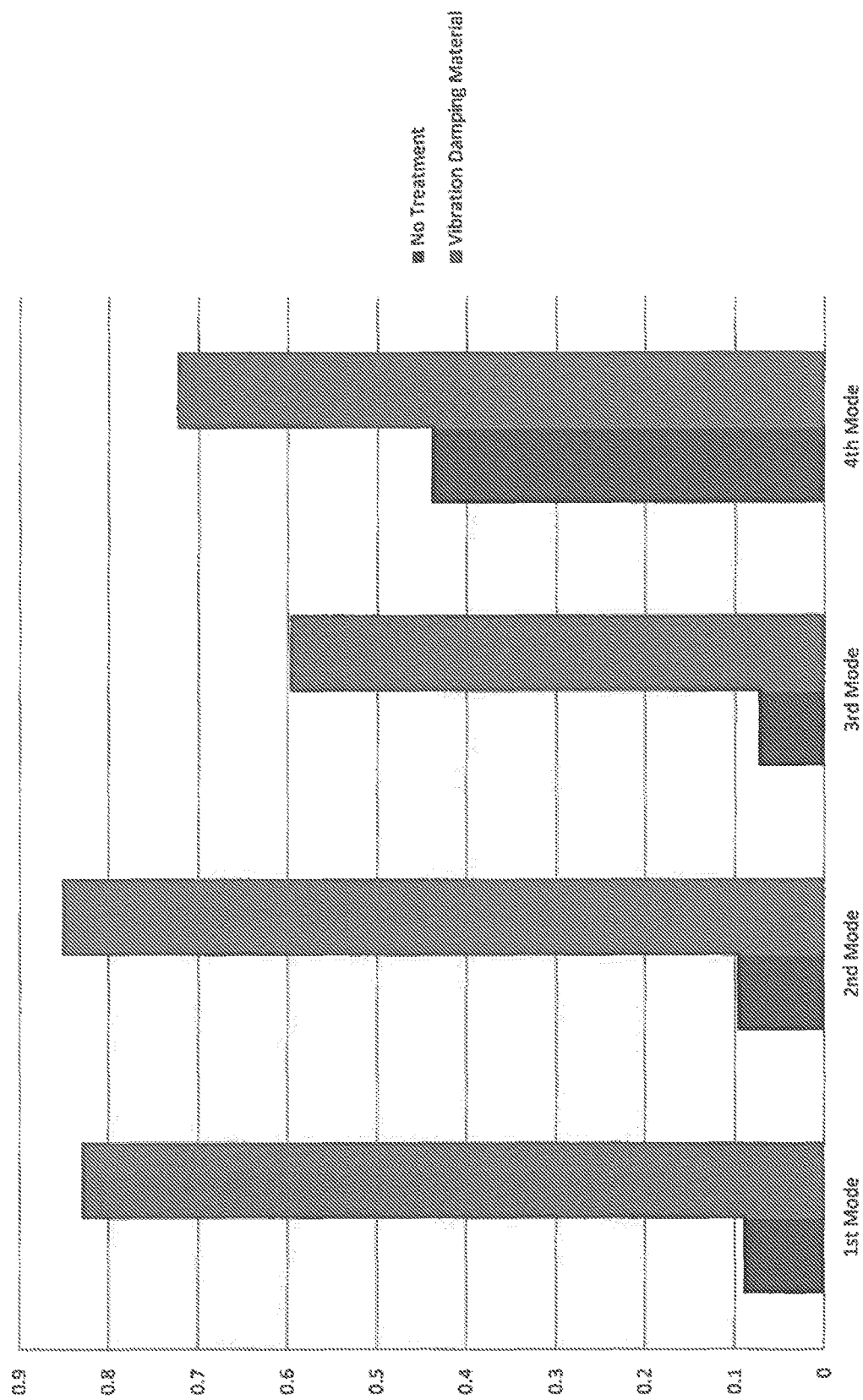

VIBRATION DAMPING INSERT

This application claims the benefit of the filing date of U.S. Provisional Application No. 62/141,440, filed Apr. 1, 2015, the entirety of the contents of that application being hereby incorporated by reference herein for all purposes.

FIELD OF INVENTION

The present disclosure relates to a damping device, methods of forming the device, methods of using the device, and a material for forming the device. The damping device may find particular utility in the damping of hollow tubular structures.

BACKGROUND

A user of any item having a hollow tube shaped portion (e.g., a transportation vehicle, lawn care device, sporting equipment or the like) may experience repetitive vibrations or shock impact in their hands and/or feet while using the item. The repetitive vibrations may lead to use to the user's discomfort including hand or foot pain or numbness, requiring the user to stop using the item for a period of time. There have been a variety of mechanisms designed around the damping of vibrations and shock absorption in transportation vehicles. But there remains a need to improve vibration damping and/or shock absorption in a variety of tube shaped items as users are still experiencing discomfort.

U.S. Patent Publication No. 2005/0081677 discloses vibration dampening in a handle by using a relatively soft tube inserted into the interior hollow of the handle. A hard inner core is then placed within the soft tube to provide for vibration dampening.

U.S. Patent Publication No. 2005/0257978 discloses a motorcycle handlebar having grip assemblies with a hollow chamber. The hollow chamber is then filled with loose particles, such as lead balls to provide vibration damping. U.S. Patent Publication No. 2014/0123805 and U.S. Patent Publication No. 2014/0123804 disclose handlebar grip portions having a filler material, such as non-elastomeric particles including glass beads, to help provide shock absorption.

U.S. Pat. No. 8,342,489 discloses a handlebar vibration damping assembly including a weight and spring. Once the assembly is secured within a handlebar, the weight is able to vibrate and oscillate at different frequencies, thereby damping vibrations.

U.S. Pat. No. 7,118,302 discloses a vehicle clamp which can be used as a motorcycle clamp with a vibration dampening insert. The clamp includes mounts for the motorcycle's handlebars and an opening for receiving the steering shaft.

U.S. Pat. No. 7,669,251 discloses an impact and/or vibration absorbent material. The material can be used for articles of clothing, such as gloves, which a user may wear while operating a motorcycle. The material minimizes the effects of impact and/or vibration forces transmitted to the user through the handlebars.

Thus, there remains a need for an article which can be inserted into hollow tube-shaped cavities (including handlebars and/or footrests) to provide vibration damping and/or shock absorption. There remains a need for an insert which may be used with a tube-shaped cavity with minimal modification (such as with an after-market product). There remains a need for an insert which is flexible to conform to the contours of the hollow tube shaped cavity. There also remains a need for an insert which can be produced in a cost-efficient manner and is easily customizable.

SUMMARY OF THE INVENTION

The present teachings relate to an insert comprising a core and one or more extensions extending from the core, wherein the insert is adapted to be inserted into a tubular cavity so that vibrations of the cavity are reduced as compared to the cavity with no insert.

The cavity may be the hollow interior of a transportation vehicle handlebar or footrest. The vehicle may be a motorcycle. The core may be cylindrical in shape having a diameter and a length, and the diameter is smaller than the diameter of the tubular cavity. The core may comprise a polymer, metal, or both. The core may be formed through extrusion. The one or more extensions may be extruded over the core. The one or more extensions may extend radially outward from the core. The one or more extensions are shaped as continuous fins which extend along the length of the core. The one or more extensions may be a plurality of fins spaced along the length of the core in a repetitive pattern. The one or more extensions may be a plurality of fins radially spaced around the core in alternating pattern. The one or more extensions may be a plurality of radial wings or radial barbs encircling the diameter of the core and spaced along the length of the core. The one or more extensions may be a plurality of partial radial wings or partial radial barbs partially encircling the diameter of the core and spaced along the length of the core in an alternating pattern. The tubular cavity may include a contoured shape and the insert may be flexible so that it can flex to match the contoured shape of the tubular cavity. The insert may include an expanded outer diameter and a contracted outer diameter. The one or more extensions are flexible so that the one or more extensions can bend, collapse, or deform when pressure is applied and resume a normal position when pressure is removed. The contracted outer diameter may be the diameter of the insert when the one or more extensions are bent, collapsed, or deformed. The expanded outer diameter may be the diameter of the insert when the one or more extensions are in the normal position. The contracted outer diameter may be about equal to or less than the expanded outer diameter. The contracted outer diameter may be about equal to or less than an inner diameter of the cavity so that the insert can be inserted into the cavity. The expanded diameter may be about equal to or greater than the inner diameter of the cavity so that the insert is securely wedged into the cavity after it is inserted into the cavity. The one or more extensions may bend or collapse in a direction that eases insertion into the cavity. The one or more extensions may be comprised of a polymeric material. The insert may include an expandable material. The expandable material may expand with the application of heat. The expandable material may include a foamable material. The insert may include an adhesive.

The disclosure further relates to a method of forming the inserts and a method of using the inserts.

The article of the disclosure is able to be inserted into a hollow tubular. The article of the disclosure is able to provide vibration damping and/or shock absorption. The insert may be inserted into a hollow cavity with minimal modification. The insert may be flexible and conform to the contours of the hollow cavity. The insert may be able to be formed in a manner which is cost-efficient and easily customizable.

BRIEF DESCRIPTION OF DRAWINGS

FIG. 12 shows a graph comparing tube structures with and without an exemplary vibration damping material in accordance with the teachings herein.

DETAILED DESCRIPTION

Figure 1:
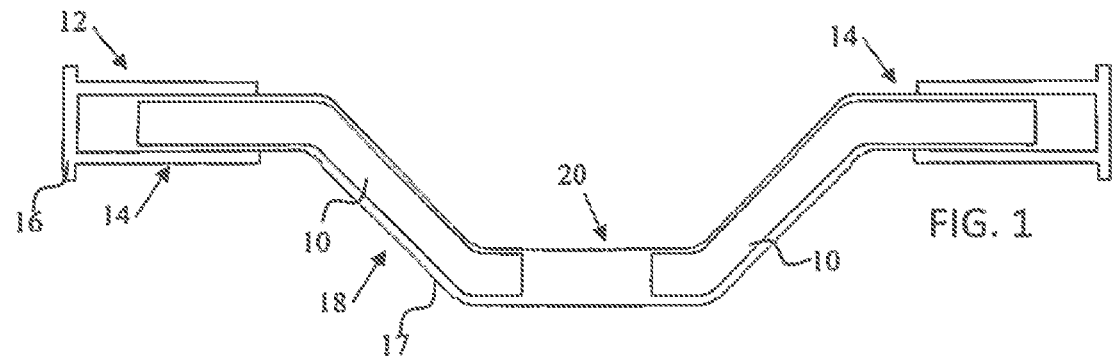
FIG. 1 is a cross-sectional view of the insert according to the teachings herein inserted into a handlebar.

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein are directed toward devices and the materials for making such devices that can be located into hollow structures for the purposes of vibration damping. These hollow structures may be made of a variety of rigid materials including but not limited to metallic materials and polymeric materials. Any hollow generally tubular structure may be filled. Non-limiting examples include baseball bats, tennis/racquetball rackets, hockey and lacrosse sticks, push lawn mower handles, riding mower zero turn handles (e.g., any heavy equipment with handle type steering), weed whackers, portable generators, hunting stands/ladder stands, chain saw handles, motorcycle/moped/bicycle handle bars and footrests, ultralight aircraft frames, go-kart and other miniaturized vehicle frames, steering wheels, bicycle frames, exercise equipment and vacuum cleaner handles.

The disclosure relates to an insert which is adapted to be inserted into a hollow tube-shaped cavity. The insert may include a core and one or more extensions extending from the core. The insert may be inserted along all of the length of the tube-shaped cavity, a substantial portion of the length of the tube-shaped cavity, or just a section or portion of the tube-shaped cavity. A single insert or multiple inserts may be placed within the tube-shaped cavity.

The insert of the disclosure may comprise a core. The core may provide the structure for the insert, provide a mounting means for additional features of the insert, and/or provide vibration damping/shock absorption. The core may be any shape, size, configuration, or combination thereof suitable for the preceding. The core preferably has a shape similar or identical to the shape of the cavity into which it may be inserted. For example, if a motorcycle's handlebar and footrests are cylindrical, the core will be cylindrical in shape. The core may be partially or completely solid or partially or completely hollow. The core may be rigid, flexible, or have rigid and flexible portions. The core preferably is sized smaller than the cavity so that it may be inserted in the cavity. For example, the core may have a diameter smaller the cavity's diameter. The core may be comprised of metal, a polymer, other materials, or a combination thereof. The core may be at least partially formed through extrusion. The core may be a polymeric material including a metal wire embedded therein. A metal wire could be co-extruded with a polymeric material. This may add one or more of weight and stiffness to the core. The core may include high density or metallic portions (e.g., inserts) and such portions may be located at desired locations for added dampening effect. In one example, such portions may be located at outermost sections of a hollow cavity. The core may be one straight segment to match a section of a tube-shaped cavity or may include multiple segments to match multiple segments of the tube-shaped cavity. The core may include contours which match contours of the tube-shaped cavity, so that may be inserted or formed continuously along a longer portion of the tube-shaped cavity. If the core is rigid, it may be designed in the shape of the tube-shaped cavity. If the core is flexible, it may bend to match the contours of the tube-shaped cavity. The core may include bend zones, which may be weakened areas or hinges along the core's length to aid in the core flexing to match the contours of the tube-shaped cavity.

The insert of the disclosure may further comprise one or more extensions extending from the core. The one or more extensions may extend radially outward from the core. The one or more extensions may provide a friction fit of the insert within the cavity, space the core from the interior walls of the cavity, aid in insertion of the insert into the cavity, and/or provide vibration damping/shock absorption. The one or more extensions may be any shape, size, configuration, or combination thereof. There may be any number of the one or more extensions. The number of one or more extensions may be selected to allow for the core to be as small in diameter as possible while the insert may provide a suitable amount of vibration damping and/or shock absorption. The one or more extensions may be located along the entire length of the core, a portion of a length of the core, concentrated in one or more sections or sides of the core, or a combination thereof. The one or more extensions include a height. The height may be the distance from where the extension is adjacent to the outer surface of the core to the peripheral edge of the extension. The outer diameter of the insert may be the diameter or cross-sectional height of the core plus the height of one or more extensions at a cross-section of the insert. The one or more extensions may have a height such that the total diameter or height of the insert is about less than, equal to, or greater than the diameter or height of the tube-shaped cavity. The one or more extensions may be made of a polymeric material or any other material capable of any of the preceding or following features. The one or more extensions may be extruded over the core, may be adhered or assembled to the core, and/or may be molded with the core. The one or more extensions may be solid, hollow, or a combination thereof.

The one or more extensions may come in a variety of shapes. The one or more extensions may be shaped as one or more continuous fins with a constant or varying thickness extending along all or part of the length of the core. The one or more extensions may be shaped as one or more fins. The fins may be shaped as thin, planar members, pins, rods, tubes, bars, wings, radial wings, partial radial wings, radial barbs, partial radial barbs, and the like or a combination thereof. The one or more extensions may be spaced along the length of the core in a repetitive pattern. The one or more extensions may be radially spaced around the core in an alternating pattern. The one or more extensions may encircle the outer diameter of the core and be spaced along the length of the core. The one or more extensions may partially encircle the outer diameter of the core and be spaced along the length of the core.

The one or more extensions may be flexible. The flexibility may aid in assembling the insert into the tube-shaped cavity. For example, the one or more extensions may bend or collapse with pressure. The pressure may be the pressure or force exerted by the cavity's interior wall as the insert is inserted into the cavity. The one or more extensions may be located on an angle relative to the core's outer surface. For example, a fin or wing may be located on an acute angle relative to the core's outer surface so that each fin or wing first enters the cavity where it abuts the core's outer surface. The acute angle may provide for less resistance in the direction of insertion of the insert while providing increased friction in the direction opposite the insertion direction. The one or more extensions may bend or collapse opposite the direction of insertion. For example, as a fin or wing enters the cavity and upon application of pressure from the cavity's inner surface, the peripheral edges of the fin or wing may be bent toward the core so that they are closer to the core's outer surface.

The insert may have a contracted outer diameter. The contracted outer diameter may be the diameter of the insert when the one or more extensions are bent, collapsed, flexed or otherwise deformed, such as by the application of pressure or force by the cavity walls. The contracted outer diameter may be the distance of one peripheral edge of the insert to an opposing peripheral edge of the insert. For example, the distance from the peripheral edge of one extension to the peripheral edge of an opposing extension. When pressure is not applied to the one or more extensions, the one or more extensions are in their normal position, not bent or collapsed. In the normal position, the insert may have an expanded outer diameter. The expanded outer diameter may be the distance from one peripheral edge of the insert to an opposing peripheral edge. The contracted outer diameter may be about equal to or less than the expanded outer diameter. The contracted outer diameter of the insert may be about equal to or less than an inner diameter of the cavity so that the insert may be fit into the cavity. The expanded outer diameter of the insert may be less than, equal to, or greater than the inner diameter of the cavity. The diameter of the insert when it is in the cavity may allow the insert to be securely wedged into the cavity without the use of additional adhesive. The diameter of the insert, such as the contracted outer diameter, may provide for a friction fit of the insert within the cavity.

The insert may further comprise an expandable material. The expandable material may provide for adhesion of the insert to the cavity; the expandable material may provide additional vibration damping and/or shock absorption. The expandable material may be any suitable material which may provide adhesion, vibration damping, shock absorption, or a combination thereof. The expandable material may be an expandable adhesive material. The expandable material be located on the peripheral edges of the one or more extensions, inside of the extensions, along exterior or interior surfaces of the extensions, part or all of the exposed outer surface of the core, within the interior of the core, or a combination thereof. The one or more extensions and/or the core may include one or more openings to allow the expandable material to flow out from within the interior of the one or more extensions and/or the core. The expandable material may be any material that may expand up application of heat. The expandable material may be a foam. Preferably the expandable material is a thermally activatable foam.

The insert may further comprise an adhesive. The adhesive may be applied to any surface of the insert, such as the peripheral edge of the one or more extensions. The adhesive may aid in installing and/or securing the insert, such as securing the insert into a cavity.

A method of forming the insert of this disclosure may include one or more of the following steps: forming a core; extruding a core; molding a core; extruding one or more extensions over the core; affixing or adhering one or more extensions to the core; molding one or more extensions with the core; molding a core with one or more extensions; inserting an expandable material into the core and/or the one or more extensions; placing an expandable material onto the core and/or the one or more extensions; and placing an adhesive on the insert.

A method of installing the insert of this disclosure may include one or more of the following steps: inserting the insert into a cavity; collapsing one or more extensions of the insert; decreasing the diameter of the insert; securing the insert to the cavity with friction; securing the insert to the cavity with an expandable material; securing the insert to the cavity with an adhesive; and expanding an expandable material.

The insert may comprise a combination of multiple materials. The insert may include a metallic portion. The insert may include an elastomeric portion. The elastomeric portion may include or be primarily composed of elastomers such as natural rubber, styrene-butadiene rubber, polyisoprene, polyisobutylene, polybutadiene, isoprene-butadiene copolymer, neoprene, nitrile rubber (e.g., a butyl nitrile, such as carboxyl-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons, combinations thereof and the like. In one embodiment, recycled tire rubber may be employed. An example of suitable elastomer-based material which may be used is Butyl 402 available from Lanxess International, SA. According to the preferred formulations, the elastomeric portion may include up to about 30% by weight elastomers, more preferably, up to about 40% by weight elastomers, and even more preferably up to about 60% by weight elastomers.

The elastomeric portion may also include one or more polymeric materials. Examples of suitable polymeric materials include, but are not limited to, acetates, ethylenes, acrylates, combinations thereof or the like. In a highly preferred embodiment, the polymeric materials include a methacrylate such an ethyl or methyl methacrylate (EMA or MMA), which may or may not be modified by another component such as glycidyl methacrylate (GMA). According to preferred formulations, the elastomeric portion may include between about 5% and about 50% by weight polymeric materials, more preferably, between about 10% and about 30% by weight polymeric materials, and even more preferably between about 15% and about 25% by weight polymeric materials. An example of a suitable polymeric material is TC-120, available from Exxon Mobil.

The elastomeric portion may include one or more filler materials. Fillers may include mineral or stone type fillers such as calcium carbonate, sodium carbonate or the like may be used as fillers. In another preferred embodiment, silicate minerals such as mica may be used as fillers. According to preferred formulations, the elastomeric portion may include between about 5% and about 50% by weight filler materials, more preferably, between about 10% and about 30% by weight filler materials, and even more preferably between about 15% and about 25% by weight filler materials.

A non-limiting example formulation for the elastomeric portions in accordance with the teachings herein is provided below at Table 1.

TABLE 1

| Material | wt. % |
|---|---|
| Isoprene-isobutylene copolymer | 60.00% |
| Ethylene Methyl Acrylate Copolymer | 20.00% |
| Calcium Carbonate | 20.00% |
| | 100.00% |

Turning to the drawings presented herewith, FIG. 1 illustrates a cross-sectional view of two inserts (10) according to the teachings herein inserted into a tube-shaped cavity, which in this particular example is a handlebar (12). The tube-shaped cavity may comprise a handle region (14), an intermediate region (18), and a steering joint region or center region (20). The handle region (14) may further include a handle grip (16) about the exterior of the tubular structure (17). The insert (10) may be a one-piece insert along the entire interior length of the tube-shaped cavity or multiple inserts, two or more, may be inserted along the length of the tube-shaped cavity. The insert (10) may be located at any portion or section of the tube-shaped cavity or one or more portions or sections of the tube-shaped cavity. For example, the insert (10) may just be located in the handle region (14), the intermediate region (18), or the center region (20), or a combination thereof. For example, the insert (10) may be located in the handle region (14) and extend into the intermediate region (18).

Figure 2:
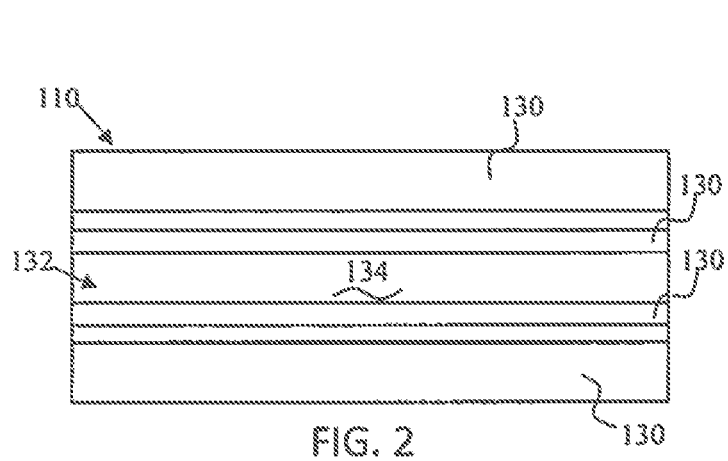
FIG. 2 is a plan view along the length of the insert according to the teachings herein.

FIG. 2 illustrates a plan view along the side of the insert (110). The insert (110) may include one or more extensions (130) and a core (132). The one or more extensions (130) may be shaped as continuous fins. The one or more extensions (130) may extend along the length (L) of the core (132). The one or more extensions (130) may be spaced evenly around the diameter (D) or outer surface (134) of the core (132). The one or more extensions (130) may be made of the same or different material as the core (132). There may be any number of one or more extensions (130) around the core (132). Illustrated is an example with six extensions (130) about the diameter (D) of the core.

Figure 3:
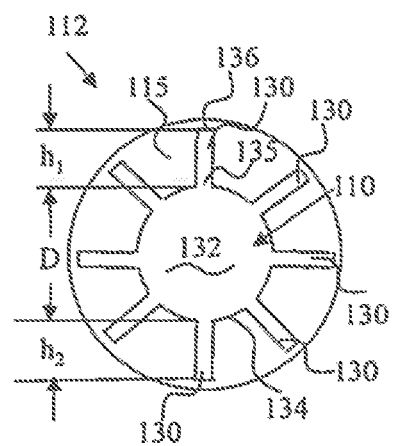
FIG. 3 is a cross-sectional view at the diameter of the insert according to the teachings herein.

FIG. 3 illustrates a cross-sectional view of the insert (110) inserted into a cavity (115) of the tube-shaped cavity (112). The insert (110) may include one or more extensions (130) and a core (132). The one or more extensions (130) may extend or protrude from the outer surface (134) of the core (132). The one or more extensions (130) may be spaced or distributed evenly around the core (130) or may have uneven spacing, be concentrated to one side of the core (130) or concentrated to a section of the core (130). The core (130) may have a diameter (D) or a height, if not cylindrical. The one or more extensions may have a height (h), shown as the distance from where the extension protrudes from the outer surface (134, 135) of the core (130) to the extension's peripheral edge (136).

Figure 4:
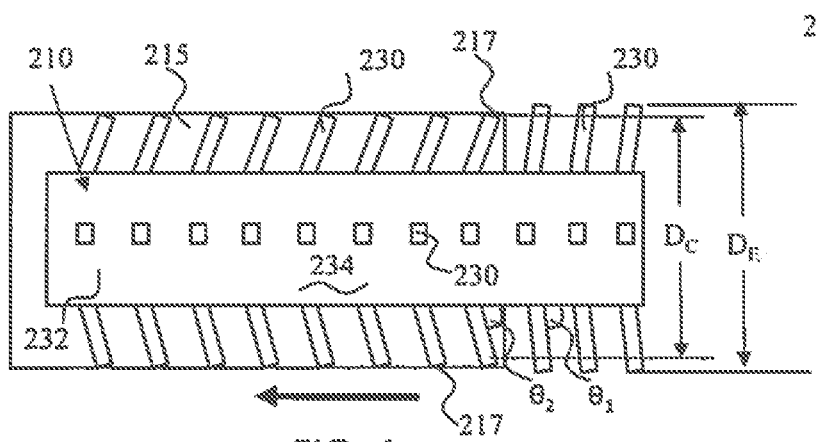
FIG. 4 is a plan view along the length of the insert according to the teachings herein.

FIG. 4 illustrates a plan view along the side of the insert (210) as it is inserted into a cavity (215). The insert (210) may include one or more extensions (230) and a core (232). The one or more extensions (230) may extend or protrude from the outer surface (234) of the core (232). The one or more extensions (230) may be spaced or distributed evenly around the core (232) or they may have uneven spacing. The one or more extensions (230) may be concentrated in one or more portions of the outer surface (234) of the core (232). The one or more extensions (230) may be shaped as fins. The one or more extensions (230) may be spaced along the length of the core (232) in a repetitive pattern. The one or more extensions (230) maybe flexible or able to bend, collapse, or otherwise deform. For example, upon insertion into the cavity (215) the pressure applied by the cavity walls (217), will flex or bend the extensions (230) to allow for easier insertion into the cavity (215). The one or more extensions (230) may be located at an acute angle ($\theta_1$) relative to the outer surface (234) of the core (232) and the direction of insertion into the cavity (215). The acute angle ($\theta_2$) may decrease in size upon the insert (210) being inserted into the cavity (215). The acute angle ($\theta_1$) and/or flexibility of the one or more extensions (230) may aid in inserting the insert (210) into a cavity (215) by acting as a guide and reducing the resistance or friction from the cavity walls (217). When there is no pressure applied on the one or more extensions (230), that overall height or diameter of the insert may be the expanded outer diameter ($D_E$). When the cavity walls apply pressure or force to the insert and the one or more extensions (230) may be at least partially flexed, bent, or collapsed, this may be the contracted outer diameter ($D_C$). The expanded outer diameter ($D_E$) may be about less than, about equal to, or about greater than the interior diameter of the cavity (215). The contracted outer diameter ($D_C$) may about equal to or about less than the interior diameter of the cavity (215).

Figure 5:
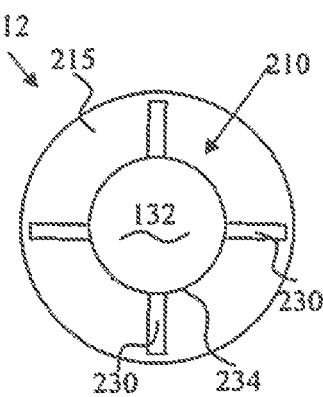
FIG. 5 is a cross-sectional view at the diameter of the insert according to the teachings herein.

FIG. 5 illustrates a cross-sectional view of the insert (210) inserted into a cavity (215) of the tube-shaped cavity (212). The one or more extensions (230) may be spaced evenly or unevenly about the diameter of the core (232). The one or more extensions (230) may be made from a different material than the core (232). For example, the one or more extensions (230) may be extruded over the core (232).

Figure 6:
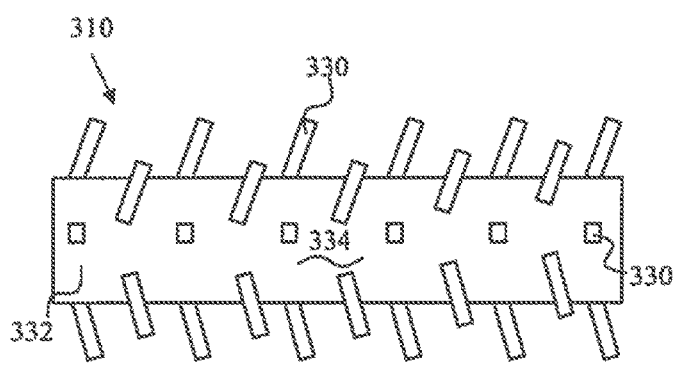
FIG. 6 is a plan view along the length of the insert according to the teachings herein.

FIG. 6 illustrates a plan view along the side of the insert (310). The insert (310) may include one or more extensions (330) and a core (332). The one or more extensions (330) may extend or protrude from the outer surface (334) of the core (332). The one or more extensions (330) may be distributed about the core (332) in an alternating pattern. The one or more extensions (330) may be shaped as fins.

Figure 7:
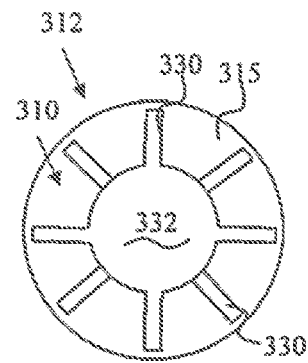
FIG. 7 is a cross-sectional view at the diameter of the insert according to the teachings herein.

FIG. 7 illustrates a cross-sectional view of the insert (310) inserted into a cavity (315) of the tube-shaped cavity (312). The one or more extensions (330) can be evenly spaced, in a repeating pattern, alternating pattern, or combination thereof about the core (332). The one or more extensions (330) may be made of the same material or a different material as the core (332). Some of the one or more extensions (330) may be made of the same material as the core (332) while other one or more extension (330) may be made of a different material as the core (332).

Figure 8:
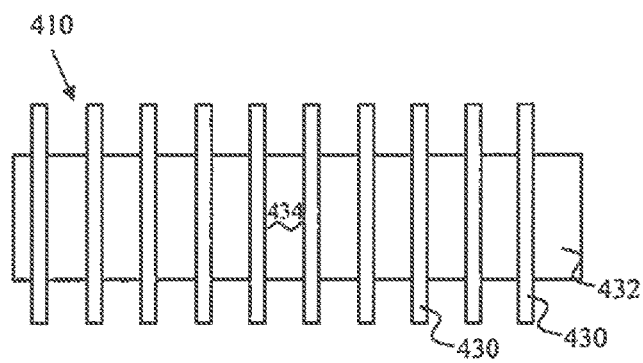
FIG. 8 is a plan view along the length of the insert according to the teachings herein.

FIG. 8 illustrates a plan view along the side of the insert (410). The insert (410) may include one or more extensions (430) and a core (432). The one or more extensions (430) may extend or protrude from the outer surface (434) of the core (432). The one or more extensions (430) may partially or fully encircle the outer diameter of the core (432). The one or more extensions (430) may be spaced or distributed evenly about the length of the core (432). The one or more extensions (430) may be shaped as a radial wings or radial barbs.

Figure 9:
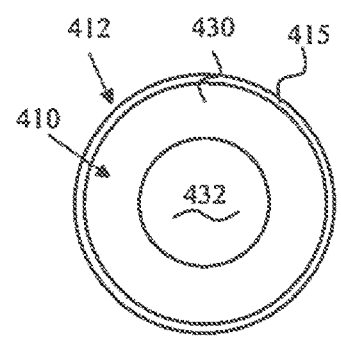
FIG. 9 is a cross-sectional view at the diameter of the insert according to the teachings herein.

FIG. 9 illustrates a cross-sectional view of the insert (410) inserted into a cavity (415) of the tube-shaped cavity (412). The one or more extensions (430) may be shaped as radial wings or barbs. The one or more extensions (430) may encircle the outer diameter of the core (432).

Figure 10:
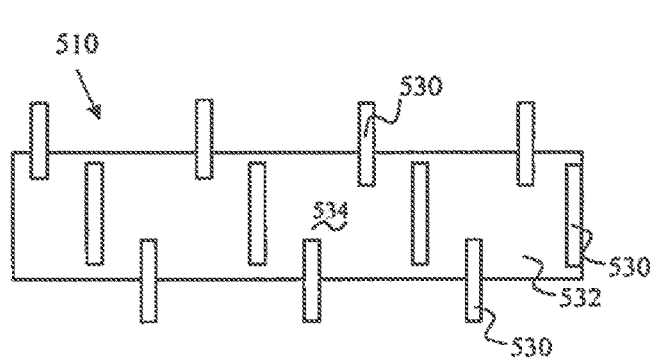
FIG. 10 is a plan view along the length of the insert according to the teachings herein.

FIG. 10 illustrates a plan view along the side of the insert (510). The insert (510) may include one or more extensions (530) and a core (532). The one or more extensions (530) may partially encircle the outer diameter of the core (532). The one or more extensions (530) may be spaced or distributed evenly or in an alternating pattern about the length of the core (532). The one or more extensions (530) may be shaped as partial radial wings or partial radial barbs which may partially encircle the outer diameter of the core (532). The one or more extensions (530) may be concentrated to only one side or section of the core (532).

Figure 11:
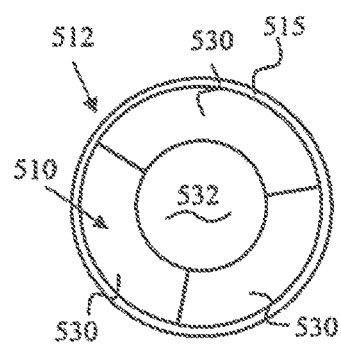
FIG. 11 is a cross-sectional view at the diameter of the insert according to the teachings herein.

FIG. 11 illustrates a cross-sectional view of the insert (510) inserted into a cavity (515) of the tube-shaped cavity (512). The one or more extensions (530) may be shaped as partial radial wings or partial barbs. The one or more extensions (530) may encircle the diameter of the core (532). Each of the one or more extensions may (530) may encircle a portion of the diameter of the core (532). The one or more extensions (530) may be placed in an overlapping pattern, such that in combination, a plurality of the one or more extensions (530) encircle the entire diameter of the core (532).

EXAMPLES

A hollow handlebar structure was tested both with and without a device in accordance with the teachings herein. One of the materials utilized for forming the device is shown at Table 1. The results are shown in the graph at FIG. 12. The hollow handlebar structure is tested in four different modes where the first mode is at 100 Hz, the second mode is at 140 Hz, the third mode is at 150 Hz and the fourth mode is at 170 Hz. The amount of damping is measured and as the graph at FIG. 12 shows, the percent of damping is significantly improved when the handlebar structure is fitted with the device and material of the present teachings as opposed to an unfilled structure.

Though not necessarily drawn to all geometries relative proportions and dimensions shown in the drawings are also part of the teachings herein, even if not explicitly recited. However, unless otherwise noted, nothing shall limit the teachings herein to the geometries, relative proportions, and dimensions shown in the drawing.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. An insert comprising:
   a) a core formed of a composition including an isoprene-isobutylene copolymer, an ethylene methyl acrylate copolymer and a filler, the core including one or more metallic inserts; and
   b) one or more extensions extending from the core;
   wherein the insert is adapted to be inserted into a tubular cavity of a baseball bat so that vibrations in the bat handle when the bat hits a ball are reduced as compared to the cavity with no insert.

2. The insert of claim 1, wherein the core is cylindrical in shape having a diameter and a length, and the diameter is smaller than the diameter of the tubular cavity.

3. The insert of claim 2, wherein the insert includes an expanded outer diameter and a contracted outer diameter.

4. The insert of claim 3, wherein the contracted outer diameter is the diameter of the insert when the one or more extensions are bent, collapsed, or deformed;
   wherein the expanded outer diameter is the diameter of the insert when the one or more extensions are in the normal position; and
   wherein the contracted outer diameter is about equal to or less than the expanded outer diameter.

5. The insert of claim 4, wherein the expanded diameter is about equal to or greater than the inner diameter of the bat handle's cavity so that the insert is securely wedged into the cavity after it is inserted into the cavity.

6. The insert of claim 3, wherein the contracted outer diameter is about equal to or less than an inner diameter of the bat handle's cavity so that the insert can be inserted into the cavity.

7. The insert of claim 1, wherein the core is formed through extrusion.

8. The insert of claim 1, wherein the one or more extensions are extruded over the metal insert.

9. The insert of claim 1, wherein the one or more extensions extend radially outward from the core.

10. The insert of claim 9, wherein the one or more extensions are shaped as continuous fins which extend along the length of the core.

11. The insert of claim 1, wherein the one or more extensions are a plurality of fins spaced along the length of the core in a repetitive pattern.

12. The insert of claim 1, wherein the one or more extensions are a plurality of radial wings or radial barbs encircling the diameter of the core and spaced along the length of the core.

13. The insert of claim 1, wherein the one or more extensions are flexible so that the one or more extensions can bend, collapse, or deform when pressure is applied and resume a normal position when pressure is removed.

14. The insert of claim 1, wherein the insert includes a chemical formulation comprsing a thermally activatable foam for causing expansion of the material that forms the insert.

15. The insert of claim 14, wherein the expandable material expands with the application of heat to form an expanded foam.

16. The insert of claim 1, wherein the insert includes an adhesive.

17. The insert of claim 16, wherein the adhesive is applied to a portion of the one or more extensions.

18. The insert of claim 16, wherein the adhesive adheres the one or more extensions to an interior wall of the bat handle cavity.

19. A baseball bat comprising a bat handle including a bat handle cavity having an interior wall;
wherein the bat handle includes the insert of claim 1 attached to the interior wall of the bat handle cavity.

* * * * *